United States Patent
Scoggins

(10) Patent No.: US 7,490,889 B1
(45) Date of Patent: Feb. 17, 2009

(54) TRAILER HITCH STEP FOR VEHICLES HAVING A TAILGATE

(76) Inventor: David Kenneth Scoggins, 130 Frazier St., Ste 16, Waynesville, NC (US) 38786

( * ) Notice: Subject to any disclaimer, the term of this patent is extended or adjusted under 35 U.S.C. 154(b) by 54 days.

(21) Appl. No.: 11/563,043

(22) Filed: Nov. 24, 2006

(51) Int. Cl.
*B60R 3/02* (2006.01)
(52) U.S. Cl. .......................................... 296/62; 280/166
(58) Field of Classification Search ................... 296/75, 296/62, 57.1; 280/163, 164.1, 166; 105/437, 105/443–450
See application file for complete search history.

(56) References Cited

U.S. PATENT DOCUMENTS

| | | | | |
|---|---|---|---|---|
| 4,124,099 | A * | 11/1978 | Dudynskyj | 414/546 |
| 5,498,012 | A * | 3/1996 | McDaniel et al. | 280/166 |
| 6,170,843 | B1 | 1/2001 | Maxwell et al. | |
| 6,474,668 | B2 | 11/2002 | Debo | |
| 6,511,086 | B2 | 1/2003 | Schlicht | |
| 6,682,086 | B1 * | 1/2004 | Erickson | 280/166 |
| 6,685,204 | B1 | 2/2004 | Hehr | |
| 6,935,647 | B2 | 8/2005 | Knodle et al. | |
| 6,994,362 | B2 * | 2/2006 | Foster | 280/163 |
| 2003/0116938 | A1 | 6/2003 | Shields et al. | |

* cited by examiner

*Primary Examiner*—H Gutman
*Assistant Examiner*—Melissa A Black
(74) *Attorney, Agent, or Firm*—David Kiewit

(57) ABSTRACT

A step assembly for use with a truck load bed has an elongated support member that can be inserted into a hitch receiver. The support is pivotally connected to a step that can be moved into several positions. In a rearward position the step is far enough to the rear of the body of the truck that the step may be stood upon when the tailgate of the vehicle is in an open, lowered position. This allows someone carrying something that is to be loaded onto the truck to approach the truck directly from the rear, to step onto the step and then onto the lowered tailgate. In an alternate, lateral, position the step is adjacent one of the sides of the load box. This allows someone to stand on the step member and reach into the load box to deposit or retrieve some relatively small article when the tailgate is in a raised, closed position. The linkages are constrained to keep a long side of the step perpendicular to the centerline of the truck in both the rearward and lateral positions.

7 Claims, 5 Drawing Sheets

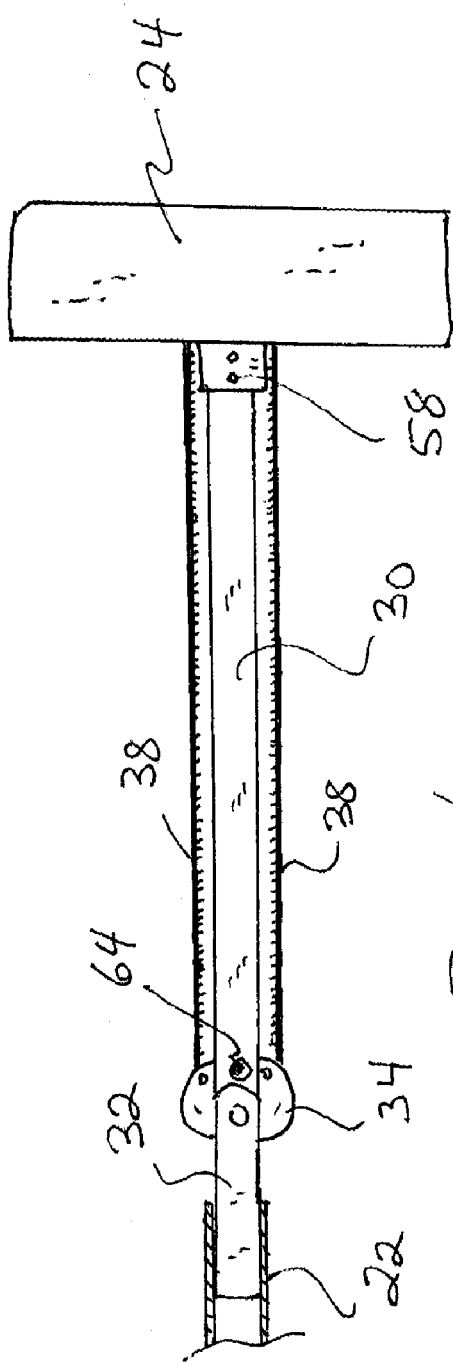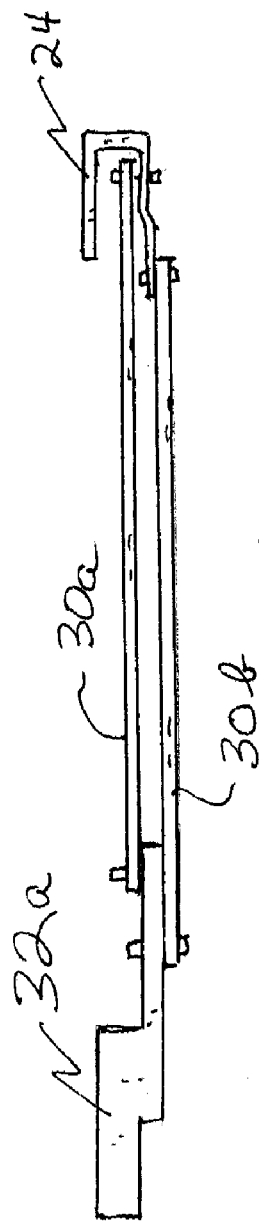

200 # TRAILER HITCH STEP FOR VEHICLES HAVING A TAILGATE

BACKGROUND OF THE INVENTION

1. Field of the Invention

The present invention relates generally to step platforms for vehicles, and, more particularly, to step assemblies that mount to a standard receiver hitch so as to provide access to a load box of a pickup truck or the like both regardless of whether the tailgate is lowered or raised.

2. Background Information

Placing items in or removing items from a pickup truck load box can be an awkward operation, particularly if the truck is equipped with a heavy duty raised suspension and the tailgate is closed so that the user has to reach over a wall of the load box. Moreover, climbing into or out of such a load box can also be difficult. Many arrangements have been proposed for solving one or both of these problems by providing an auxiliary step mountable to a vehicle in order to aid a user who wants to reach into or step into or out of a truck load box. Some of these steps work well when the tailgate is in an upright and closed position, but are rendered inaccessible when the tailgate is lowered. Others project to the rear or side of the vehicle so as to be accessible when the tailgate is lowered, but are in a hazardous and awkward location when the tailgate is raised.

There is thus a need for a step assembly that is mountable at the rear of a pickup truck or similar vehicle so as to assist both in entering the load box when the tailgate is down and in accessing items in the load box when the tailgate is raised. Ideally, the step assembly should provide a step that is relatively long along a direction transverse to the vehicle axis so as to provide a maximum step width. Additionally, the step should protrude only minimally to the rear of the vehicle when not in use.

Furthermore, there exists a need for such a step assembly that detachably mounts to a standard receiver hitch at the rear of a pickup truck or similar vehicle, so as to be conveniently and stably secured thereto.

BRIEF SUMMARY OF THE INVENTION

The preferred step assembly comprises an elongated support member having a front end that can be inserted into the hitch receiver when the step assembly is to be used. A linkage portion of the step assembly comprises at least one elongated linkage member having a front end pivotally connected to the support member near its rear end. The second, rear, end of the linkage member is pivotally connected to an elongated generally rectangular step member that can be moved into several positions. In a rearward position the step member is positioned rearwardly of the hitch receiver and the body of the truck by a distance sufficient that the step may be stood upon when the tailgate of the vehicle is in an open, lowered position. This allows someone carrying something that is to be loaded onto the truck to approach the truck directly from the rear, to step onto the step member and then onto the lowered tailgate. In an alternate, lateral, position the preferred step member is positioned adjacent one of the sides of the load box. This allows someone to stand on the step member and reach into the load box area in order to deposit or retrieve some relatively small article when the tailgate is in a raised, closed position. The linkages used in practicing the invention are constrained to keep the long side of the step perpendicular to the axis of the support member and the axis of the vehicle in both the rearward and at least one lateral position.

Some preferred embodiments of the invention employ a linkage comprising a rigid linkage member, a flexible belt and two pulley wheels. A first of the pulley wheels and a front end of the rigid linkage member are connected to a support member attached adjacent a rear end of the vehicle. In this arrangement the first pulley wheel is fixed with respect to the support member and the rigid linkage member is pivotally connected to the support member along a pivot axis coaxial with the first pulley wheel. The second of the pulley wheels and the step member share an axle that is journaled within a rear end portion of the rigid linkage member. In particular preferred embodiments the pulley wheels have axially-oriented grooves or detents and the flexible belt, which is of the sort commonly used as a timing belt in internal combustion engines, has corresponding transverse protrusions that mate with the grooves as the assembly moves from one position to another.

Other embodiments of the invention employ a linkage comprising two rigid parallel linkage members. Each of the two linkage members has a respective front end respectively pivotally connected to a support member. Each of the two linkage members has a respective rear end respectively pivotally connected to the step member. In some embodiments, in which the step is movable between a rearward position and only one lateral position, one of the two parallel linkage members is attached to the support member along an axis thereof and the second of the linkage members has a front end respectively pivotally connected to the support member at a point laterally displaced from the axis of the support member.

Although it is believed that the foregoing rather broad summary description may be of use to one who is skilled in the art and who wishes to learn how to practice the invention, it will be recognized that the foregoing recital is not intended to list all of the features and advantages. Those skilled in the art will appreciate that they may readily use both the underlying ideas and the specific embodiments disclosed in the following Detailed Description as a basis for designing other arrangements for carrying out the same purposes of the present invention and that such equivalent constructions are within the spirit and scope of the invention in its broadest form. Moreover, it may be noted that different embodiments of the invention may provide various combinations of the recited features and advantages of the invention, and that less than all of the recited features and advantages may be provided by some embodiments.

BRIEF DESCRIPTION OF THE SEVERAL VIEWS OF THE DRAWING

FIG. 1*a* depicts a setting of the step assembly for accessing a left side portion of the load box when the tailgate is up, FIG. 1*b* depicts a setting of the step assembly for accessing the load box along the centerline thereof when the tailgate is down and FIG. 1*c* depicts a setting for accessing a right side portion of the load box when the tailgate is up.

FIG. 6 of the preferred embodiment shown in side detail views in FIGS. 2, 3, and 4.

FIG. 7 is a side view of the pantagraph embodiment of FIG. 5.

DETAILED DESCRIPTION OF THE INVENTION

Figure 1:
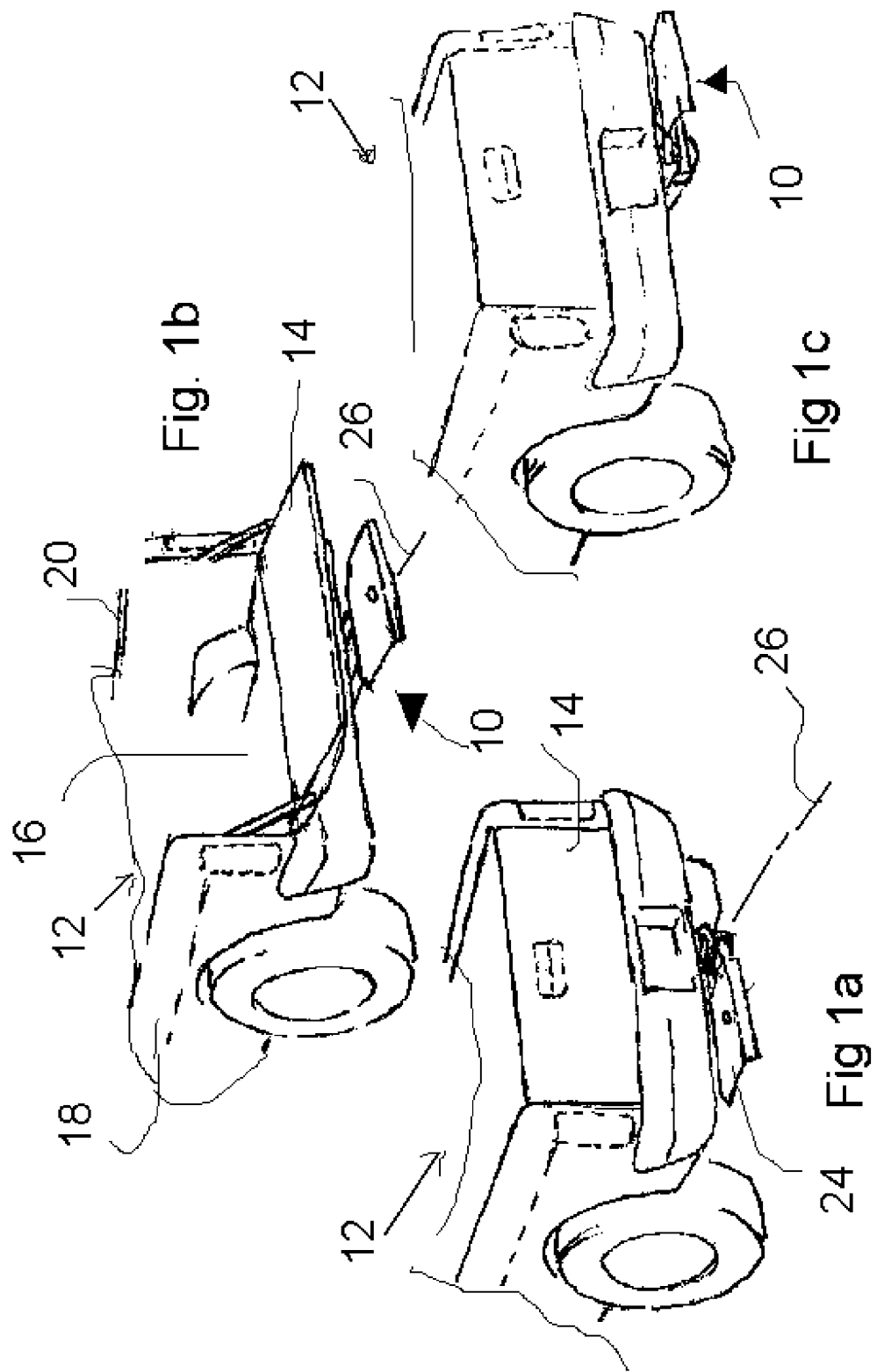
FIGS. 1*a* to 1*c* are perspective views of a step assembly of the invention attached to a truck, where

A step assembly of the invention 10 may be used with a pickup truck 12 or other vehicle having a tailgate 14 extending laterally across a load box 16 from a left side 18 to a right side 20 of the vehicle 12. The tailgate is hinged along a bottom edge so that when it is in an open, lowered position the tailgate extends rearwardly of the vehicle.

Many pickup trucks are equipped with trailer hitches. Some of these comprise a hitch receiver assembly fixedly connected to a frame of the truck. When the hitch is to be used a hitch ball assembly comprising an elongated support piece and a hitch ball is inserted into the hitch receiver 22 and connected to it by means of transverse pins (not shown). When the hitch is not in use, the hitch ball assembly, which necessarily protrudes beyond the rear end of the vehicle, is generally removed from the receiver so as to reduce risks of personal injury or property damage. The preferred embodiments disclosed in this detailed description provide a load bed step assembly that is preferably connected to and removed from a hitch receiver in the same manner used for the hitch ball. However, the reader should note that the invention is not limited to this sort of attachment arrangement, but encompasses any other arrangement for attaching a front end of a step assembly adjacent the rear end of a vehicle.

Turning now to FIGS. 1a-c, one finds a step assembly 10 of the invention selectively set in three different positions adjacent the rear end of pickup truck 12. In FIGS. 1a and 1c the tailgate 14 of the truck is up—i.e., in a raised and closed position and the step 24 is selectively positioned adjacent either the right 20 or left 18 side of the rear of the truck. In FIG. 1b the tailgate 14 of the truck is down and the step 24 is positioned rearwardly of the top of the lowered tailgate and along the centerline 26 of the truck 12.

The step 24 depicted in FIGS. 1a-c is generally rectangular in shape and is oriented so that the long side of the rectangle is perpendicular to the centerline 26 of the truck—i.e., parallel to the tailgate hinge axis. It may be noted that the step need not be rectangular and that the exact shape of it is not important. It is however, believed that the step should be elongated along a selected direction and that the selected direction should be maintained parallel to the tailgate hinge axis when the step is moved from one position to another. The use of an elongated, rather than an equiaxed, step is believed to make the step both more convenient and safer to use. That is, for any selected maximum step extent and protrusion beyond the rear end of the vehicle, a greater step area is provided by elongating the step. Keeping the elongated step in a consistent position parallel to the tailgate hinge is believed to provide enhanced utility and user safety.

Various embodiments of the step assembly of the invention 10 comprise an elongated linkage member 30 pivotally connected to a support member 32 adjacent the rear end of a truck when the apparatus is in use. The length of the linkage member 30 is selected to be approximately the same as the height of a vehicle tailgate. Thus, when the step 24 is moved into its most rearward position (e.g., as depicted in FIG. 1b) it is positioned behind the top of the lowered tailgate so that a user can use the step 24 when getting into or out of the load bed 16. In preferred embodiments for use with a truck having a hitch receiver 22, the support member 32 is elongated and of a size selected for insertion into the hitch receiver 22 so that it can be pinned in place in the same fashion one would use for attaching a hitch ball assembly.

Figure 2:
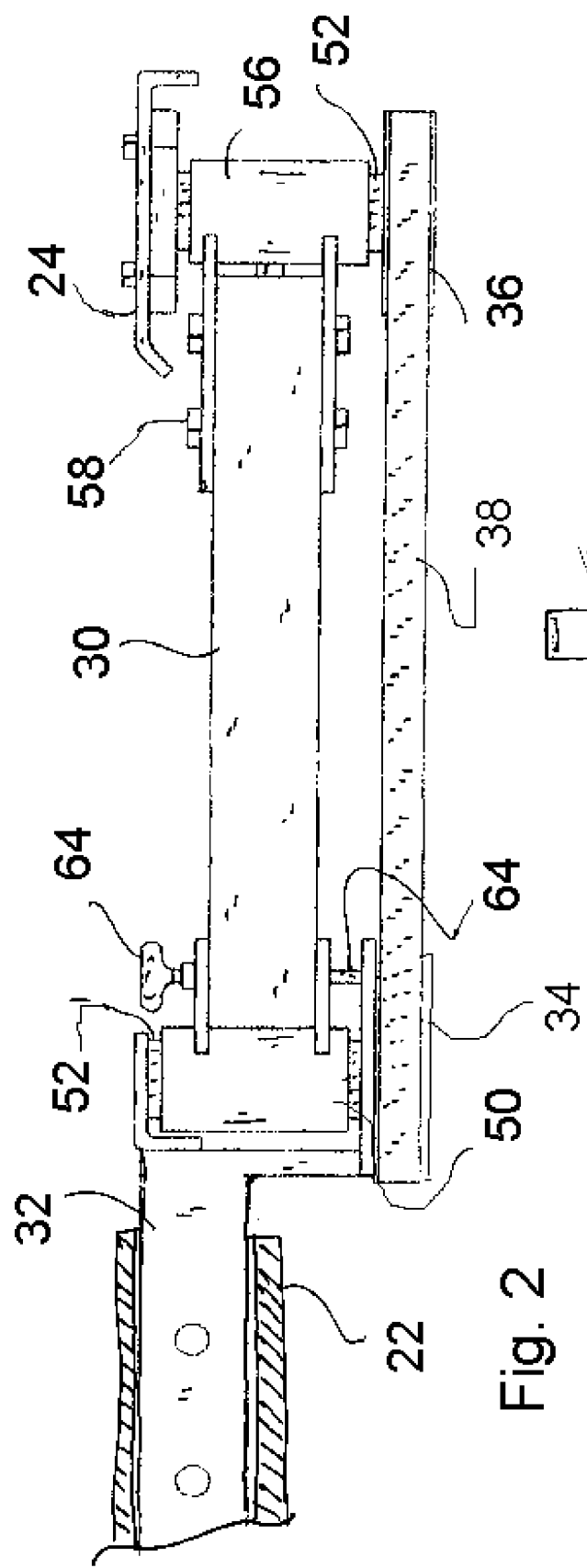
FIG. 2 is a side elevational view of an embodiment of the step assembly of the invention in a fully extended setting.

A preferred embodiment of the step assembly of the invention, depicted in FIG. 2, comprises a pair of pulley wheels 34, 36 and a flexible belt 38, where the belt is preferably selected to comprise transverse tooth-like protrusions and the pulley wheels are selected to comprise mating transverse grooves for receiving the protrusions. This sort of belt and wheel arrangement is commonly used in controlling valve timing in an internal combustion engine.

Figure 3:
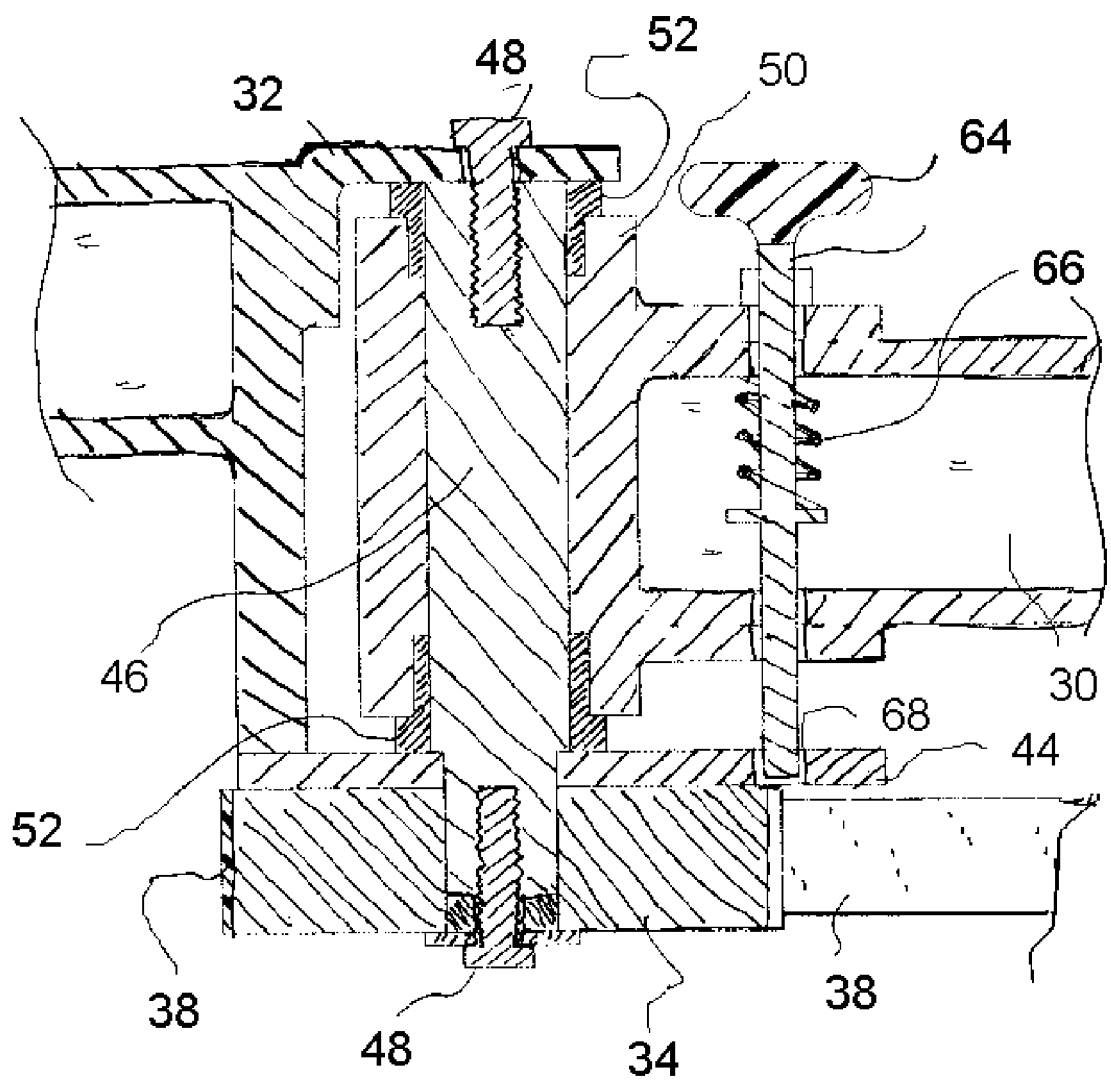
FIG. 3 is a partly schematic detail cross-sectional view of the forward end of the step assembly of FIG. 2.

Turning now to FIG. 3, one finds a cross-sectional detailed view of a front portion of a step assembly 10, i.e., a portion that is immediately adjacent the rear end of a vehicle with which it is used. The depicted assembly comprises an elongated support member 32 insertable into a hitch receiver. This support member 32 is part of a stationary portion of the assembly that is pivotally connected to the front end of a linkage member 30 so that the linkage member can pivot about a forward vertical pivot axis 42 in order to move the step among the various positions in which it is used. It may be noted that the forward pulley wheel 34 is part of the stationary portion of the assembly and is positioned so that the axis of that pulley wheel is coaxial with the forward pivot axis 42.

In the embodiment depicted in FIG. 3 the support member 32, the fixed pulley wheel 34 and a position selection plate 44 are clamped to a stationary axle 46 by bolts 48. A sleeve 50, fixedly attached to the linkage member 30, is journaled about the stationary axle 46, preferably by means of suitable bushings 52. Those skilled in the mechanical arts will recognize that there are many ways of providing a stationary assembly portion comprising a support member and a fixed forward pulley wheel. Moreover it will be appreciated that the depiction of FIG. 2 has been made schematic to some extent in the interest of clarity of presentation and that some portions of the assembly shown as single pieces may comprise subassemblies of suitable joined elements.

Figure 4:
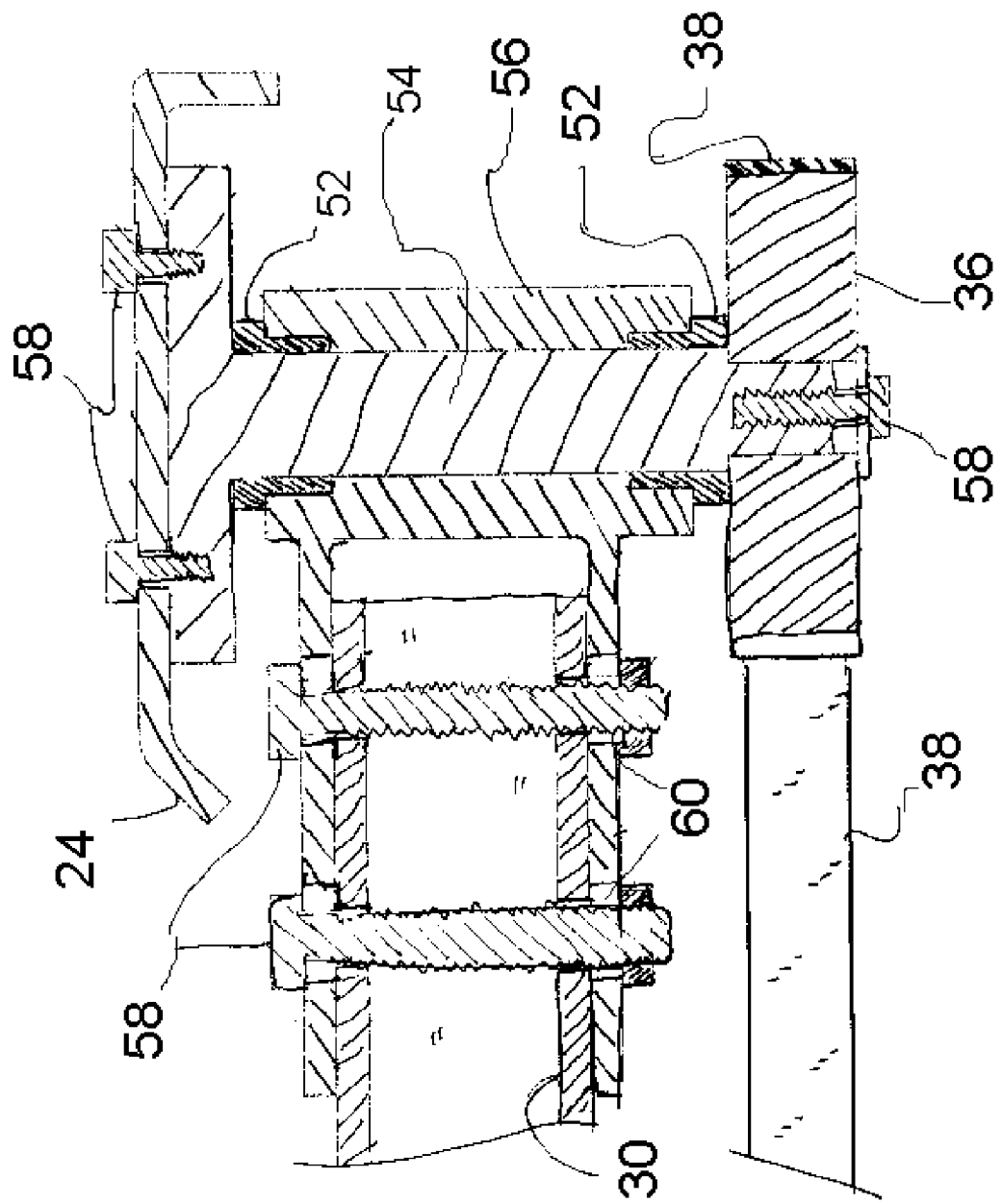
FIG. 4 is a partly schematic detail cross-sectional view of the rear, step, end of the step assembly of FIG. 2.

Turning now to FIG. 4, one finds a partially schematic cross-sectional view of the rear end of a preferred assembly 10. In this depiction a rear pulley wheel 36 is fixedly connected by a vertically oriented rotatable axle 54 to a step 24. This axle 54 is journaled, preferably by means of suitable bushings 52, within a rear sleeve 56 attached to the elongated linkage member 30. This arrangement allows the step 24 and the rear pulley wheel 36 to pivot with respect to the linkage member 30. In a particular preferred embodiment, the rear sleeve member 56 is bolted to the linkage member by appropriate bolts 58 extending through slotted holes 60 that allow the distance between the two pulley wheels 34, 36 to be selected so as to properly tension the drive belt 38.

In preferred embodiments the two pulley wheels 34, 36 have the same diameter. This, combined with the fixed attachment of the front pulley wheel 34, ensures that the orientation of the step remains constant as the linkage member 30 pivots as long as there is no slippage in the drive belt 38. As noted above, this potential slippage problem may be averted by selecting a toothed belt of the sort commonly used for valve timing in internal combustion engines.

In addition to moving the step from one position to another while maintaining a constant orientation, it is also important to provide a means of locking the apparatus into a selected setting. In a preferred embodiment, this is done by means of a captive pin 64 that is biased against a position locking plate 44 by means of a suitable spring 66. As is commonly done with pivotal structures, a plurality of holes 68 in the locking plate allows the captive pin 64 to be used to lock the linkage into one of several selected positions. Those skilled in the art will recognize that many other approaches may be used to provide an identical functional result.

Figure 5:
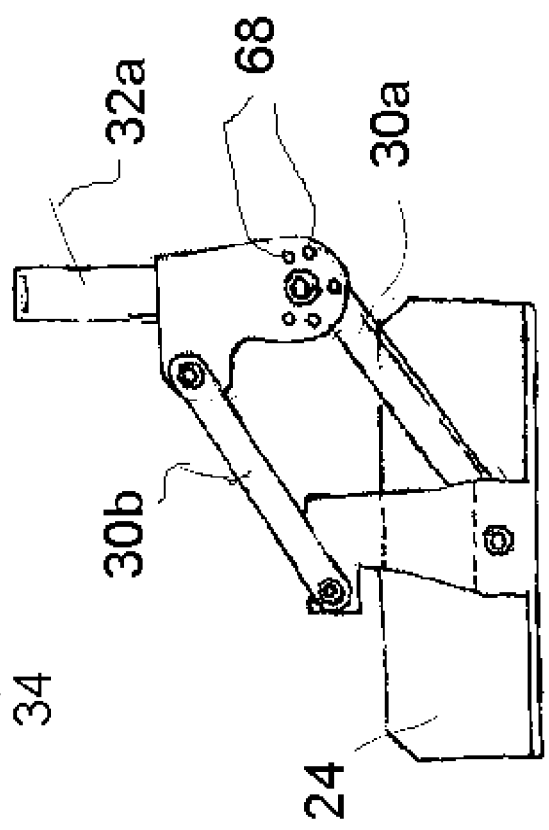
FIG. 5 is a bottom view of a second embodiment of the invention.

The reader should recognize that other arrangements may be used to provide a means of positioning a step at a forward position immediately adjacent at least one side of a rear end of a vehicle and at a rearward position along the vehicle's axis and sufficiently far to the rear that the step can be used when the vehicle's tailgate is lowered. This is provided, for example, by a second embodiment of the invention depicted in FIG. 5. The depicted second embodiment uses a pantographic linkage having two parallel elongated linkage members 30a, 30b that are respectively pivotally connected to both a support member 32a and a step 24.

In a preferred version of this second embodiment a central linkage member 30a is pivotally connected to the support member 32a along the axis of the hitch assembly and is pivotally connected to a midpoint of the step 24. This central linkage member 30a is selected to be strong enough to carry whatever loads are expected to be placed on the step. A secondary linkage member 30b is pivotally connected to the support member at a location displaced from the axis of the hitch assembly and to the step at a corresponding non-central location. This allows the step 34 to be pivoted between a rearward position, in which the central linkage member extends along the axis of the vehicle, and one lateral position in which the central linkage member is perpendicular thereto. The arrangement depicted in FIG. 5 does not allow the step to move into a second lateral position in which the step is parallel to the tailgate hinge on the other side of the load bed.

Although the present invention has been described with respect to several preferred embodiments, many modifications and alterations can be made without departing from the invention. Accordingly, it is intended that all such modifications and alterations be considered as within the spirit and scope of the invention as defined in the attached claims.

The invention claimed is:

1. A step assembly for a vehicle having a tailgate hinged to and extending laterally across a load box from a left side thereof to a right side thereof adjacent a rear end of the vehicle, the step assembly comprising:
   a support member insertable into a hitch receiver adjacent a rear end of the vehicle;
   a linkage comprising at least one elongated linkage member having a front end and a rear end, the front end of the at least one linkage member pivotally connected to the support member about a first vertical pivot axis; and
   a step member elongated along a selected direction, the step member pivotable about a second vertical pivot axis adjacent the rear end of the at least one linkage member so that the step member is selectively usable in and movable between a rearward position in which the step member is positioned rearwardly of the vehicle by a distance sufficient that the step may be stood upon when the tailgate of the vehicle is in an open, lowered position, and at least one lateral position in which the step member is positioned adjacent one of the sides of the load box, so that the step may be stood upon when the tailgate of the vehicle is in a closed, raised position;
   wherein the linkage constrains the selected direction of elongation of the step member to be parallel to the tailgate hinge in the rearward position, in the at least one lateral position, and in all positions therebetween.

2. The step assembly of claim 1 wherein the linkage comprises a rigid linkage member, a flexible belt and two pulley wheels, a first of the pulley wheels fixedly attached to the support member and the second of the pulley wheels rotatable about a common pivot axis with the rear end of the rigid linkage member.

3. The step assembly of claim 1 wherein the linkage comprises two parallel horizontal rigid linkage members, a first of the linkage members having a front end pivotally connected to the support member about the first vertical pivot axis, and a rear end pivotally connected to the step about the second vertical pivot axis; the second of the linkage members having a front end pivotally connected to the support member about a third vertical pivot axis and a rear end pivotally connected to the step about a fourth vertical pivot axis.

4. The step assembly of claim 1 wherein the step member is selectively movable among the rearward position, a first lateral position in which the step is adjacent the right side of the load box and a second lateral position in which the step is adjacent the left side of the load box.

5. A step assembly for a vehicle having a hitch receiver attached thereto, the vehicle further having a tailgate extending laterally across a load box from a left side thereof to a right side thereof, the step assembly comprising:
   a support member having an axis extending from a rear end thereof to a front end thereof, the front end of the support member insertable into the hitch receiver;
   a pantographic linkage comprising two parallel linkage members, each of the linkage members having a respective front end respectively pivotally connected to the support member about a respective first vertical pivot axis adjacent the rear end of the support member; each of the linkage members further comprising a respective rear end respectively pivotally connected about a respective second vertical pivot axis to an elongated, generally rectangular step member so that the step member is selectively movable between a rearward position in which the step member is positioned rearwardly of the hitch receiver by a distance sufficient that the step may be stood upon when the tailgate of the vehicle is in an open, lowered position, and a lateral position in which the step member is positioned adjacent one of the sides of the load box so that the step may be stood upon when the tailgate of the vehicle is in a closed, raised position, and wherein a longer side of the step member is perpendicular to the support member in both the rearward and the at least one lateral position.

6. A step assembly for a vehicle having a hitch receiver attached thereto adjacent a rear end thereof, the vehicle further having a tailgate extending laterally across a load box from a left side thereof to a right side thereof, the step assembly comprising:
   a support member having an axis extending between a rear end thereof and a front end thereof, the front end of the support member insertable into the hitch receiver;
   a step member elongated along a selected direction; and
   a linkage comprising a rigid linkage member, a flexible toothed belt comprising transverse protrusions and two pulley wheels having grooves cooperating with the transverse protrusions on the belt, wherein
   a first of the pulley wheels is fixedly attached to the support member adjacent the rear end thereof;
   a front end of the rigid linkage member is pivotally connected to the support member adjacent the rear end thereof by a first vertical axle coaxial with the first pulley wheel; and
   the second pulley wheel is fixedly connected to the step by means of a second vertical axle journaled to a rear end of the rigid linkage member;
   whereby the step member is selectively movable between a rearward position in which the step member is oriented so that the selected elongation direction is perpendicular to the axis of the support member and is positioned rearwardly of the hitch receiver by a distance sufficient that the step may be stood upon when the tailgate of the vehicle is in an open, lowered position, and at least one lateral position in which the step member is oriented so that the selected elongation direction is perpendicular to the axis of the support member and the step member is positioned adjacent one of the sides of the load box so that the step may be stood upon when the tailgate of the vehicle is in a closed, raised position.

7. The step assembly of claim 6 wherein the step member is selectively movable among the rearward position, a first lateral position in which the step is adjacent the right side of the load box and a second lateral position in which the step is adjacent the left side of the load box.

* * * * *